United States Patent

Atamian

[15] 3,689,136
[45] Sept. 5, 1972

[54] SUNGLASSES WITH REVERSIBLE SHADE PORTIONS

[72] Inventor: Zaven Atamian, 4103-Saugus Ave., Sherman Oaks, Calif. 91403

[22] Filed: Sept. 9, 1970

[21] Appl. No.: 70,844

[52] U.S. Cl. .................... 351/44, 351/45, 351/47, 2/14 J
[51] Int. Cl. .............................................. G02c 7/10
[58] Field of Search..........351/44, 90, 45, 85, 54, 41, 351/55, 61, 115, 47

[56] References Cited

UNITED STATES PATENTS

| | | |
|---|---|---|
| 3,531,189 | 9/1970 | Petito .......................... 351/90 |
| 1,239,691 | 9/1917 | Howe .......................... 351/45 |
| D208,502 | 9/1967 | Halpern et al. ....... 351/45 UX |
| 2,907,041 | 10/1959 | Finn ........................... 351/47 |

FOREIGN PATENTS OR APPLICATIONS

| | | |
|---|---|---|
| 898,701 | 7/1944 | France......................... 351/85 |

Primary Examiner—David Schonberg
Assistant Examiner—Robert L. Sherman
Attorney—Wolf, Greenfield, Hieken and Sacks

[57] ABSTRACT

Sunglasses having a pair of removable lenses. Each lens has side-by-side zones of different light-transmitting characteristics. The frame is arranged with lens-supporting means adapted to selectively support the lenses in one of two relatively inverted positions with either of the zones directly in front of the wearer's eyes and the other of the zones at the side adjacent the temple of the frame.

9 Claims, 5 Drawing Figures

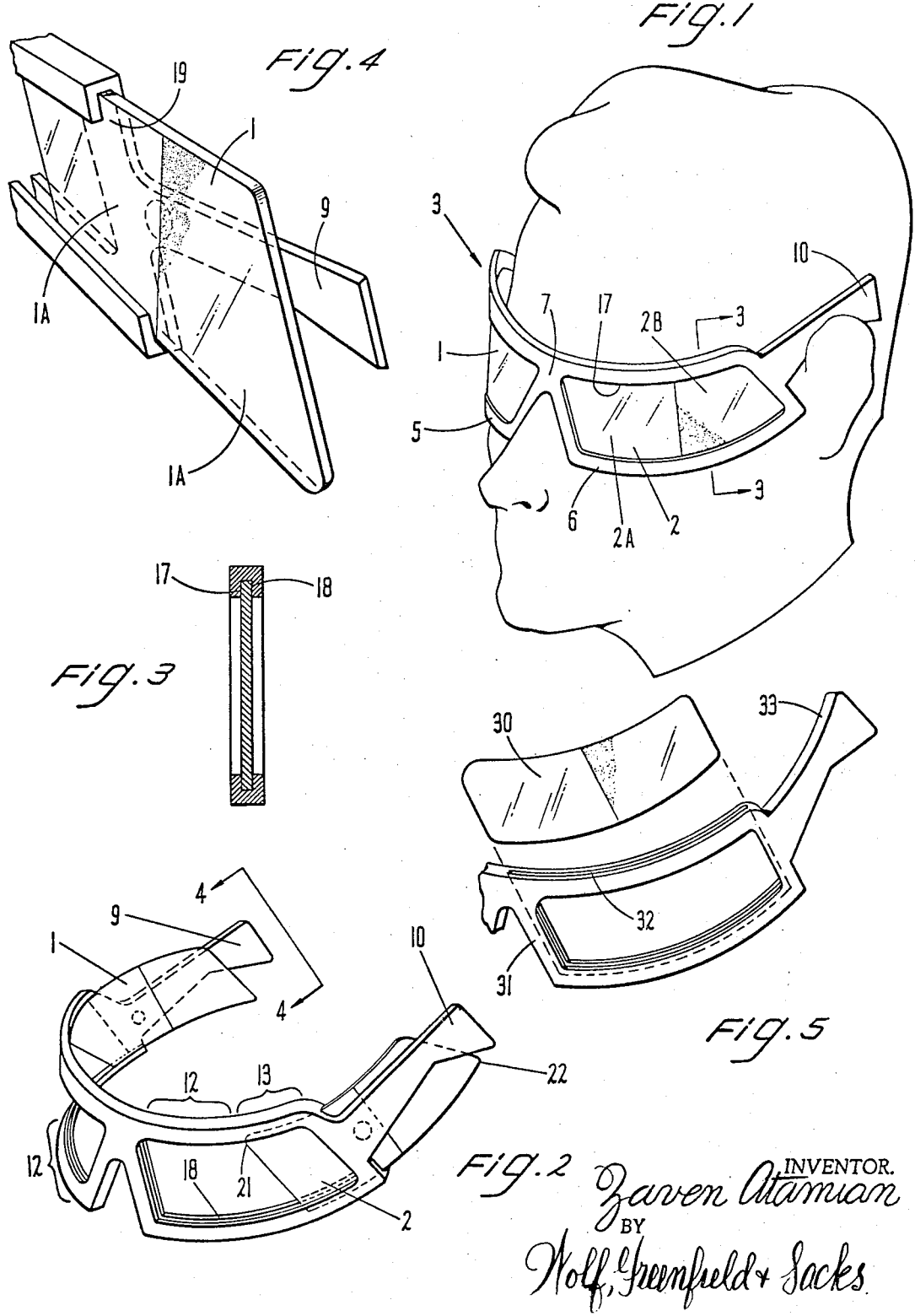

SUNGLASSES WITH REVERSIBLE SHADE PORTIONS

SUBJECT MATTER OF THE INVENTION

The present invention relates to improvements in eye wear and, in particular, to goggles or sunglasses.

BACKGROUND OF THE INVENTION

Many different sunglasses or goggles are designed with removable lenses. These sunglasses or goggles are designed primarily to permit selective interchange of filters to adapt the sunglasses or goggles to varying light conditions, which can change hourly. The lenses used for bright sun conditions cannot be used in an overcast condition as insufficient light is transmitted through the lens to permit the skier to see the contour of the terrain clearly. If the sunglasses are removed, the wind or snow impairs the skier's vision. On the other hand, if the lens which is ordinarily used during overcast conditions (which brightens the scene) was used during a bright period, the intensity of the light would be increased and would be harmful to the eyes.

Another problem often encountered in presently available sunglasses for sportsmen and the like is what to do with the non-used lenses. A one-piece lens ordinarily is made of soft plastic, approximately 8 inches by 3 ½ inches in size. A lens of this size cannot be carried in one's pocket without deforming or scratching it; and a rigid container to protect it is bulky and hazardous to a skier during a fall.

SUMMARY OF THE INVENTION

It is therefore an object of the present invention to provide improved sunglasses or goggles for use by sportsmen and the like which provide removable lenses adapted to be selectively rearranged to afford different light-filtering characteristics in front of the wearer's eyes.

A further object of the present invention is to provide improved sunglasses or goggles having a pair of movable lenses made with a plurality of zones of different light-filtering characteristics which may be selectively and interchangeably arranged in front of the wearer's eyes.

A further object of the present invention is to provide improved sunglasses or goggles in which the temple area is provided with integral means for carrying alternate filters.

A further object of the present invention is to provide improved sunglasses or goggles in which the side portions of the frame are provided with filter lenses of different characteristics than the front portion of the frames.

It is also an object of the present invention to provide sunglasses or goggles of improved construction which are simple to make, rugged in construction and in which it is easy to rearrange the lenses to effect different light transmitting characteristics in the portion of the lenses directly in front of the wearer's eyes.

BRIEF DESCRIPTION OF THE DRAWINGS

The foregoing objects and advantages of the present invention will more clearly be understood when considered in conjunction with the accompanying drawings in which:

FIG. 1 is a perspective view of a preferred embodiment of the present invention illustrated as worn;

FIG. 2 is a perspective view of the embodiment of FIG. 1 with the lenses partially removed;

FIG. 3 is a cross sectional view taken substantially along the line 3—3 of FIG. 1;

FIG. 4 is a fragmentary perspective view of the embodiment of FIG. 2 taken substantially along the line 4—4 of FIG. 2; and FIG. 5 is a fragmentary detail of a modification of the preferred embodiment.

BRIEF DESCRIPTION OF PREFERRED EMBODIMENTS

Referring to FIG. 1 there is illustrated a preferred embodiment of the present invention which comprises essentially a lens means consisting of lenses 1 and 2. These lenses are supported in a frame means 3. The frame means 3 consists essentially of means for individually securing lenses 1 and 2. These means comprise the lens frames 5 and 6. The lens frames 5 and 6 are interconnected with one another by a bridge 7. A pair of temples 9 and 10 are interconnected each to a different one of the lens frames 5 and 6 respectively at the sides remote from the bridge 7. The Frame means 3 may be formed by any suitable material but in the preferred embodiment illustrated it is formed of a plastic which may be suitably molded with the bridge 7, lens frames 5 and 6 and temples 9 and 10 integrally formed as a single piece. In this arrangement the lens frames 5 and 6 each have a first portion adjacent the bridge 7 adapted to support a zone of a lens in front of the wearer's eyes. This first zone extends, for example, approximately the length of the bracketed portion 12. A second portion 13 lateral with respect to the first portion is adapted to support a second zone of the lens within the lens frame in an area lateral with respect to the wearer's eyes and generally extending from a position approximately at the side of the eye rearwardly towards the wearer's ear or temple.

The frame means 3 preferably comprises a wraparound frame with the lens frames 5 and 6 having a width much greater than and approximately double the conventional eyeglass lens frame. The width of these lens frames 5 and 6, thus extend arcuately with width portion 12 of the lens frame generally lying in front of the wearer's eye when the frame is worn and portion 13 generally lying laterally of and extending rearwardly of the wearer's eye. Accordingly the temples 9 and 10 are much shorter than conventional temples.

The frames 5 and 6 have a continuous member that defines the inner periphery 17 of each lens frame. Channels 18 extends about the inner periphery 17 of the lens frames. These channels 18 are adapted to receive the outer periphery of the lenses when they are supported in the lens frames. A slot 19 is formed in the continuous members that defines the lens frames. In the embodiment of FIGS. 1 to 4 this slot 19 is formed at the rear end of the frames 5 and 6 adjacent to the temples 9 and 10. The slot has a length at least equal to the maximum length of the lenses 1 and 2 so as to permit the lenses to be slid into the lens frame as illustrated in FIGS. 2 and 4.

The lens means comprising the left and right lenses 1 and 2 are shaped to be received in the frame. The left and right lenses 1 and 2 are similar in construction except that they are substantially mirror images of each other. The lenses are formed of sheet material of a type generally used for sunglasses purposes and may include, for example, a cast acrylic such as CR-39 material or any suitable plexiglass polypropolene or polyethylene material having light transmitting characteristics. The lenses are formed with two zones of different light transmitting characteristics illustrated respectively at 1A and 1B and 2A and 2B. Zones 1A and 2A may, for example, attenuate ultra-violet rays to a greater extent than zones 1B and 2B. Other variations in characteristics may be provided. For example one zone may be smoked in color while the other is clear or amber. Preferably zones 1A and 2A are the same in characteristics as are zones 1B and 2B. The lenses are preferably arcuately cast to conform with the arcuate curve of the lens frames. Preferably zones 1A and 1B of lens 1 are equal in area and are laterally arranged with each forming approximately one-half the lens. Similarly zones 2A and 2B of lens 2 are laterally arranged with each forming approximately one-half the lens. The lenses are provided with an outer periphery that is snugly received within the channel 17. The outer periphery of each lens on one side of a diagonal through the lens as for example from corner 21 to corner 22 of lens 2 is a mirror image of the periphery on the other side. By thus arranging the periphery of the lenses 1 and 2 and the inner periphery of the lens frames 5 and 6 in this symmetrical arrangement, the lenses may be readily removed through the slots 19 from the frame, inverted and replaced so as to selectively locate either of the zones 1A or 1B in the case of lens 1 or 2A or 2B in the case of lens 2 in front of the wearer's eyes with the other zone arranged laterally thereto.

By this arrangement a skier or other wearing a sunglass embodying the present invention may selectively position one of two different light transmitting lenses in front of his eyes with the other zone of light transmitting qualities laterally adjacent thereto.

The present invention may be modified in a manner such as illustrated in FIG. 5. In this arrangement one-half of a sunglass is shown; the other half being similar in construction in accordance with the previous description. In this arrangement a lens 30 may be similar in construction, shape and properties as the lens previously described. The lens frame 31 may also be similar in construction to the lens frame previously described except for provision of a slot 32 in the upper portion of the member defining the lens frame rather than at the end of the frame adjacent to the temple 33.

Alternate constructions are contemplated in which the lens frames only partially extend about the lenses and in which the lenses may either be flat formed and flexed into the arcuate shape described or alternately cast in an arcuate form in the manner as described above.

The present invention contemplates making the lenses in the following manner. The zones, as for example, 1A and 1B are made of material as previously described. These zones are sandwiched between sheets of clear plastic material, as for example, a compatible clear acrylic. The outer sheets of clear plastic are each of uniform thickness and of width and length dimensions to span and cover the adjacent surfaces of the butted zones 1A and 1B. The sandwich is suitably sealed or cemented in a uniform thickness.

In a modification of the invention a cover for a motor bicycle helmet is provided. In this arrangement the conventional motor bicycle helmet having a somewhat semi spherical transparent face guard is formed with two zone transparancies similar to zones 1A and 1B. The zones are defined one from another along a line which when worn on a helmet extends substantially from one ear of the wearer around the front of the helmet on a level with the wearer's upper lip or bottom of his nose to the other ear. The transparent face guard is provided with clip attachments for securing to the helmet which are shaped, and located to permit inversion of the face guard so that either zone may be placed in front of the wearer's eyes.

What is claimed is:

1. A sunglass construction comprising;
   a pair of lenses each having a pair of zones of different light transmitting characteristics arranged side by side,
   a pair of lens frames for holding respective lenses of said pair of lenses,
   a bridge intercoupling said lens frames,
   each said lens being selectively insertable in its associated frame with like zones of said pairs of zones disposed in front of a wearer's eyes and adjacent the bridge, and the other like zones of said pairs of zones disposed generally laterally of said wearer's eyes whereby said lenses are retractable and insertable in a reverse manner so that the other of said pair of zones is disposed in front of the wearer's eyes.

2. A sunglass construction as set forth in claim 13 wherein each said lens has an elongated dimension larger than its other dimensions with said zones arranged in sequence along the elongated dimension.

3. A sunglass as set forth in claim 1 wherein said lens frames are shaped to receive said lenses in one of two positions with said positions inverted with respect to each other.

4. A sunglass as set forth in claim 3 wherein said lens frames are formed with an inner periphery having channels adapted to receive and support the periphery of said lens.

5. A sunglass as set forth in claim 4 including a bridge interconnecting said lens frames and a pair of temples connected each to a different one of said lens frames remote from said bridge.

6. A sunglass as set forth in claim 5 wherein said lens frames are formed of a continuous member defining said inner periphery with a slot formed in said member in planar alignment with said channels whereby said lens may be inserted and removed from said lens frame through said slot.

7. A sunglass as set forth in claim 1 wherein said lens means comprises a lens sheet of transparent material arcuately curved with said zones defined one from the other along a line angular to the radius of said arcuate curve.

8. A sunglass as set forth in claim 7 wherein the periphery of said lens on one side of a diagonal through said lens is substantially a mirror image of the portion of the periphery on the other side of said lens.

9. A sunglass construction as set forth in claim 1 wherein said lens means includes a pair of transparent plastic sheets overlying and sandwiching said pair of zones therebetween.

* * * * *